United States Patent Office 3,240,788
Patented Mar. 15, 1966

3,240,788
METHOD OF MAKING PROPYLENE
MONOTHIOCARBONATE
Edward Broderick, Perkasie, Pa., and Jose Luis Villa,
Cream Ridge, N.J., assignors to Thiokol Chemical
Corporation, Bristol, Pa., a corporation of Delaware
No Drawing. Filed Sept. 29, 1964, Ser. No. 400,252
5 Claims. (Cl. 260—327)

The present application is a continuation-in-part of our prior pending application Serial No. 226,716, filed September 27, 1962, now abandoned.

This invention relates to a novel process for the preparation of propylene monothiocarbonate, from which propylene sulfide is readily obtainable.

Propylene sulfide is an important compound useful in the formation of homopolymers and copolymers, and as an intermediate in the production of other chemical substances. The use of propylene sulfide in commercial applications, however, has been limited because of technical and economic disadvantages in the methods known for its preparation. Some disadvantages of known processes are the use of large quantities of expensive reactants, low yield, and undesired polymerization of substantial portions of the propylene sulfide product. To avoid the problem of premature polymerization of propylene sulfide, it is desirable to have an intermediate compound which is stable in storage from which propylene sulfide can be simply and economically prepared.

In our companion application Serial No. 400,251, filed Septeber 29, 1964, it is pointed out that the novel compound propylene monothiocarbonate satisfies this requirement, in that it is stable in storage and readily convertible to propylene sulfide in high yield. The novel intermediate compound propylene monothiocarbonate and a method of making the same are claimed in our said companion application. An alternative method of making this intermediate is disclosed and claimed in the present application.

It is accordingly a principal object of the present invention to provide a novel and effective method of making propylene monothiocarbonate. Other objects of the invention will be in part obvious and in part pointed out hereafter.

In accordance with one embodiment of the invention, propylene monothiocarbonate is prepared by reacting propylene oxide and carbonyl sulfide in the presence of a suitable tertiary amine catalyst at a temperature between 30° and 90° C., preferably between 60° and 90° C. The catalyst may be used in amounts of about 0.4 to 6% by weight based on the propylene oxide charge. The reaction proceeds to completion ordinarily within four to twenty hours depending upon the reaction conditions, the proportions of the reactants and the catalyst used. Shorter or longer reaction times may be used in particular cases.

The amine catalysts of the present invention are of the formula:

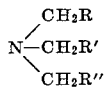

wherein R, R' and R" are selected from hydrogen and alkyl and aryl groups of 1 to 6 carbon atoms, the R, R' and R" groups may be the same or different. In the above fromula R, R' and R" may be phenyl groups or alkyl groups such as methyl, ethyl, propyl, isopropyl or hexyl groups. Typical amines that fall within the scope of the above formula are trimethyl, triethyl, triisopropyl, methyldiethyl, dimethylbenzyl and dimethylisobutyl amines. The preferred catalyst is trimethylamine.

The reaction of propylene oxide and carbonyl sulfide is preferably conducted with the reactants in the liquid phase. Because of the volatility of the reactants, pressures above atmospheric pressure are generated when the reaction is carried out at temperatures in the upper part of the temperature range indicated above. However, pressure has no apparent effect on the yields of propylene monothiocarbonate obtainable. When a closed reaction system is employed, the autogenous pressure in the reactor is ordinarily used. In the event a higher pressure is desired, an inert gas such as nitrogen may be introduced into the reactor to increase the reaction pressure. Lower operating pressures may be obtained either by conducting the reaction at low temperature in an open system, or at higher temperatures in a closed system in the presence of an inert solvent with a relatively low volatility, for example, tetrahydrofuran or dioxane. Such a solvent, or combination of solvents, may be used in amounts preferably up to about one-third the weight of the total carbonyl sulfide charge.

Propylene oxide and carbonyl sulfide react in a mol to mol ratio. However, in order to achieve a faster and more nearly complete reaction, it is desirable to use an excess amount of carbonyl sulfide. The preferred molar amount of carbonyl sulfide is up to about twice the number of mols of propylene oxide charge. The excess amount of carbonyl sulfide also serves as a solvent or co-solvent for the reaction mixture.

It is important to note that no more than trace amounts of impurities are tolerable in the reaction system. Thus, in order to obtain optimum yields of propylene monothiocarbonate it is desirable to remove impurities such as water, hydrogen sulfide and carbon dioxide from the reactants, solvents and inert gases before they are charged to the reaction system.

The order in which the reactants are charged to the reactor is important because of the tendency of propylene oxide to polymerize in the presence of strongly basic catalysts. Therefore, propylene oxide should be introduced into the reactor after the carbonyl sulfide, catalyst and solvents, if any, have been charged to the reactor and the reactor heated to nearly the desired reaction temperature.

Propylene monothiocarbonate, the intermediate product obtained by the present process, is a liquid material which has the structure

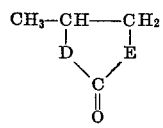

wherein D and E are selected from different members of the group consisting of sulfur and oxygen. The isomer wherein D is oxygen and E is sulfur is believed to predominate in the product mixture produced by the propylene oxide and carbonyl sulfide reaction. However, the yield of propylene sulfide obtainable from the propylene monothiocarbonate does not appear to depend upon which isomeric form is used.

Propylene sulfide can be prepared by heating propylene monothiocarbonate at between about 140° and 210° C., preferably between 180° and 210° C., whereupon it decomposes to give propylene sulfide and carbon dioxide. The reaction may be conducted in a simple distillation vessel. The carbon dioxide side product may be vented or collected as desired. Propylene sulfide obtained from the reaction may be purified by distillation. The heating of propylene monothiocarbonate preferably is conducted in the presence of a basic catalyst. Catalysts which have been found suitable include potassium carbonate, sodium methoxide, sodium hydroxide, sodium phosphate, sodium acetate and sodium borate.

The following examples, which are set forth to illustrate embodiments of the present method of making propylene monothiocarbonate, are not intended to limit in any way the scope of the present invention.

*Example 1*

A steel pressure bomb was charged with 40 grams of a solution of 48.5 grams of trimethylamine in 100 ml. of tetrahydrofuran and 180 grams of carbonyl sulfide. The bomb was heated to 64° C. which raised the pressure of the system to 300 p.s.i.g. Over a period of 20 minutes 116 grams of propylene oxide was added to the bomb after which addition there was a decrease in the pressure of the system to 205 p.s.i.g. The bomb was then heated to 90° C. with a consequent increase in the pressure to 325 p.s.i.g. After 1½ hours the bomb was immersed in an ice bath which decreased the temperature to 55° C. and pressure to 200 p.s.i.g. The bomb was then allowed to stand at ambient temperatures for an additional 1½ hours and finally opened to the atmosphere. Immediately prior to opening the bomb, the temperature of the system was 40° C. and internal pressure 161 p.s.i.g. The resultant liquid was washed with water whereby an emulsion formed which was separated by a salting out process. The separated product was dried in a rotary dryer at 40–50° C. to yield 88 grams of propylene monothiocarbonate.

*Example 2*

A refluxing apparatus was charged with 116 grams of propylene oxide and heated to a reflux temperature of about 35° C. While the propylene oxide was refluxing, carbonyl sulfide was fed into the system and, at the same time, 20 grams of benzyl dimethyl amine added slowly through an addition funnel. Carbonyl sulfide was continuously fed into the reactor for 10 hours, a total of 131 grams being used. During the reaction the temperature of the system climbed from the initial 35° C. to about 47° C. The reaction product was washed with water, whereby an emulsion formed which was separated by a salting out process. The washed material was dried over anhydrous magnesium sulfate to yield 16 grams of propylene monothiocarbonate.

It should be apparent from the foregoing examples that the present invention provides a novel and improved process for preparing propylene monothiocarbonate. It is to be understood of course that the foregoing examples are illustrative only and that numerous changes can be made in the ingredients, proportions and conditions specifically set forth therein without departing from the spirit of the invention as set forth in the appended claims.

We claim:
1. A method of making propylene monothiocarbonate which comprises reacting propylene oxide and carbonyl sulfide at a temperature of between about 30° C. and 90° C. in the presence of a basic catalyst of the formula

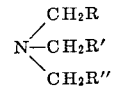

wherein R, R' and R" are selected from hydrogen and alkyl and aryl groups of 1 to 6 carbon atoms, and recovering propylene monothiocarbonate from the reaction products.

2. A method according to claim 1 and wherein said catalyst is trimethylamine.

3. A method according to claim 1 and wherein said catalyst is benzyldimethylamine.

4. A method according to claim 1 and wherein said propylene oxide and carbonyl sulfide are reacted under autogenous pressure at a temperature of 60° to 90° C.

5. A method according to claim 1 and wherein said propylene oxide and carbonyl sulfide are reacted in a solvent medium which is tetrahydrofuran at a temperature of 60° to 90° C.

References Cited by the Examiner

UNITED STATES PATENTS 3,072,846   1/1963   Millikan _____ 260—327

OTHER REFERENCES

Durden et al., J. Org. Chem., vol. 26 (1961), pages 836–9.

Etlis et al., Zhur. Obshch. Khim., vol. 32 (Sept. 1962), pages 2940–2.

WALTER A. MODANCE, *Primary Examiner.*